(12) United States Patent
Pearson et al.

(10) Patent No.: US 7,305,185 B2
(45) Date of Patent: Dec. 4, 2007

(54) DEVICE FOR INTEGRATING DEMULTIPLEXING AND OPTICAL CHANNEL MONITORING

(75) Inventors: Matt Pearson, Ashton (CA); Peter Krug, Nepean (CA)

(73) Assignee: Enablence Inc., Kanata, Ontario (CA)

( * ) Notice: Subject to any disclaimer, the term of this patent is extended or adjusted under 35 U.S.C. 154(b) by 654 days.

(21) Appl. No.: 10/457,565

(22) Filed: Jun. 10, 2003

(65) Prior Publication Data

US 2004/0008987 A1 Jan. 15, 2004

Related U.S. Application Data

(60) Provisional application No. 60/386,717, filed on Jun. 10, 2002.

(51) Int. Cl.
*H04B 10/08* (2006.01)
(52) U.S. Cl. .......................................................... 398/34
(58) Field of Classification Search .................. 398/87; 385/37, 24
See application file for complete search history.

(56) References Cited

U.S. PATENT DOCUMENTS

| | | | | |
|---|---|---|---|---|
| 4,736,360 | A * | 4/1988 | McMahon | .................... 398/87 |
| 5,748,815 | A * | 5/1998 | Hamel et al. | .................. 385/24 |
| 5,805,285 | A | 9/1998 | Johs et al. | |
| 6,249,626 | B1 | 6/2001 | Bergmann | |
| 6,339,662 | B1 * | 1/2002 | Koteles et al. | ................. 385/24 |
| 6,389,201 | B1 | 5/2002 | Urino | |
| 6,480,648 | B1 | 11/2002 | Wade et al. | |
| 6,603,906 | B2 | 8/2003 | Qin et al. | |
| 2002/0057875 | A1 | 5/2002 | Kaneko | |

* cited by examiner

*Primary Examiner*—Jason Chan
*Assistant Examiner*—David Lee
(74) *Attorney, Agent, or Firm*—Teitelbaum & MacLean; Neil Teitelbaum; Doug MacLean

(57) ABSTRACT

A method for integrating power monitoring capabilities with passive demultiplexing operations, utilizing the high-order diffraction from an optical diffraction grating. The technique helps avoid insertion loss and polarization dependent loss penalties, and device size penalties, typically incurred with optical taps and multiple diffraction gratings. The technique can also be modified slightly to provide information on channel wavelength and optical signal-to-noise-ratio, as well as channel power.

11 Claims, 2 Drawing Sheets

DEVICE FOR INTEGRATING DEMULTIPLEXING AND OPTICAL CHANNEL MONITORING

CROSS-REFERENCE TO RELATED APPLICATION

This application claims the benefit under 35 USC 119(e) of prior U.S. provisional application Ser. No. 60/386,717 filed Jun. 10, 2002.

BACKGROUND OF THE INVENTION

1. Field of the Invention

This invention relates to the field of photonics, and in particular to a device for integrating demultiplexing and optical channel monitoring. The invention is applicable to integrated optical components, as well as components based on bulk-optics.

2. Description of Related Art

In an optical telecommunications network based on dense wavelength division multiplexing (DWDM), several closely-spaced wavelength channels are multiplexed onto a single optical fiber and transmitted to another system node where the channels are demultiplexed and detected individually. It is very important in DWDM networks to monitor the power in each wavelength channel, as well as other channel information, such as wavelength and optical signal to noise ratio (OSNR), which can vary significantly from channel to channel due to wavelength-dependent amplification or loss.

Figure 1:
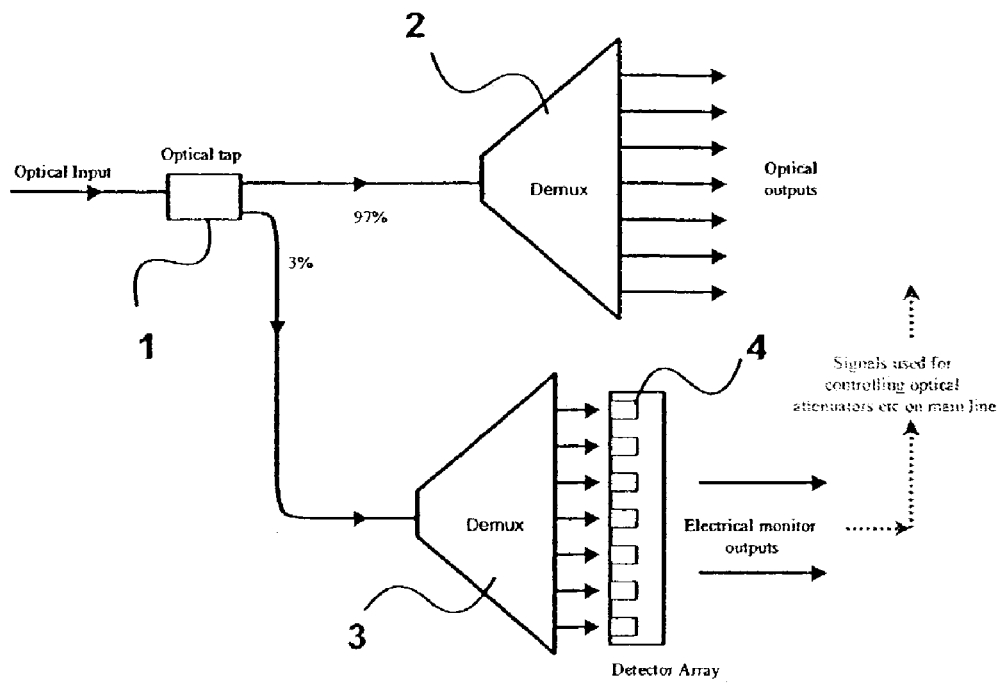

This monitoring is often performed at system nodes immediately before the main signal is demultiplexed. This is typically accomplished by tapping a small fraction of the signal (1% to 5%) off the main transmission line before the demultiplexer. These two signals, the "main" signal and the "monitoring" signal, are then sent to separate demultiplexers and separated into their individual wavelengths. The monitoring channels pass to a detector array for measuring the power in each channel, while the main signals split into individual optical fibers for coupling to their individual receivers or, for example, variable optical attenuators. This typical functionality is illustrated in FIG. 1. An input signal is input to an optical tap 1, which splits the signal into a first portion containing 97% of the light that goes to a demultiplexer 2 providing the optical outputs. The tap passes 3% of the light to a demultiplexer 3 that provides outputs that a detected by a detector array 4.

A key product focus for integrated optic and bulk-optic component manufacturers is integration of multiple functions into a single module. For example, it would generally be desirable to integrate an optical demultiplexer with an optical channel monitor, including the 1% optical tap. Such a device would accomplish the functionality illustrated in FIG. 1.

One major difficulty with this approach is that in integrated optics, optical taps often exhibit a polarization dependent loss (PDL), a major problem for all telecommunications components. Also, it is difficult to manufacture even a single optical demultiplexer on a single chip. The functionality demonstrated in FIG. 1 requires two demultiplexers. Furthermore, all of the components need to be individually temperature controlled. Integrating three building blocks into a common device results in a large device that is difficult to manufacture and has potential PDL problems.

SUMMARY OF THE INVENTION

According to the present invention there is provided a device for integrating demultiplexing and optical channel monitoring, comprising a diffraction grating; an input waveguide providing an optical input to said diffraction grating; a first set of output waveguides providing optical outputs to said diffraction grating at a predetermined order of diffraction; and a second set of output waveguides providing monitor outputs to said diffraction grating at another order of diffraction different from said predetermined order of diffraction.

The extra order of diffraction is normally higher than the predetermined order of diffraction providing the optical outputs. In a preferred embodiment a further set of waveguides are provided to receive a further order of diffraction. These can be used for measuring, for example, inter-channel noise.

This invention thus describes a method for integrating the functions of optical demultiplexing and optical tapping, in order to manufacture the functionality demonstrated in FIG. 1, but with the use of no optical tap, and with only a single optical demultiplexer. Also, the invention does not generally induce any additional optical loss to the system, and in fact can operate without tapping the typical 1%-5% off the main optical fiber. It can also substantially eliminate the polarization dependent loss that can often accompany an optical tap.

The invention is applicable to integrated optics, but also to devices based on bulk-optic diffraction gratings.

In a broad aspect, therefore, the invention uses the light diffracted into higher orders of the grating, which is typically just the source of insertion loss in the device. This light that is diffracted into higher orders is a fixed percentage of the incoming light, and is precisely the same wavelength as the main signal, and contains the same information as the main signal, albeit at a much lower intensity.

The light can be collected and sent to a detector array, which after calibration with a known source can provide information such as the optical power in each channel of the system. Virtually all demultiplexers rely on a diffractive element, and virtually all diffractive elements diffract light into higher orders. Designers typically try to minimize the amount of light diffracted into higher orders (to minimize optical loss in the main signal), but it is extremely difficult to eliminate entirely, making the invention suitable for a wide array of applications. This includes Echelle Grating demultiplexers, Arrayed Waveguide Grating demultiplexers, and bulk optic diffraction grating demultiplexers.

The monitor outputs, i.e. those positioned to collect the light from higher orders, can be positioned on the channel grid and monitor the channels at channel center, in the same way as the light from the main signal is collected at the demultiplexer output. However, with a slight modification to the above design, the monitor outputs can be positioned off-center, or be composed of a split-waveguide output, which means different orders can be received to deduce different information about the main optical signal. This type of information could include the monitoring of channel wavelength, and optical signal to noise ratio, as well as channel power.

In a further aspect the invention provides a method of performing demultiplexing and optical channel monitoring, comprising the steps of directing an optical input signal containing multiple channels to a diffraction grating; receiving reflected and diffracted signals at a first set of output waveguides providing optical outputs at a predetermined order of diffraction; and receiving reflected and diffracted signals at a second set of output waveguides providing monitor outputs at another order of diffraction different from said predetermined order of diffraction.

DETAILED DESCRIPTION OF THE INVENTION

Figure 2:
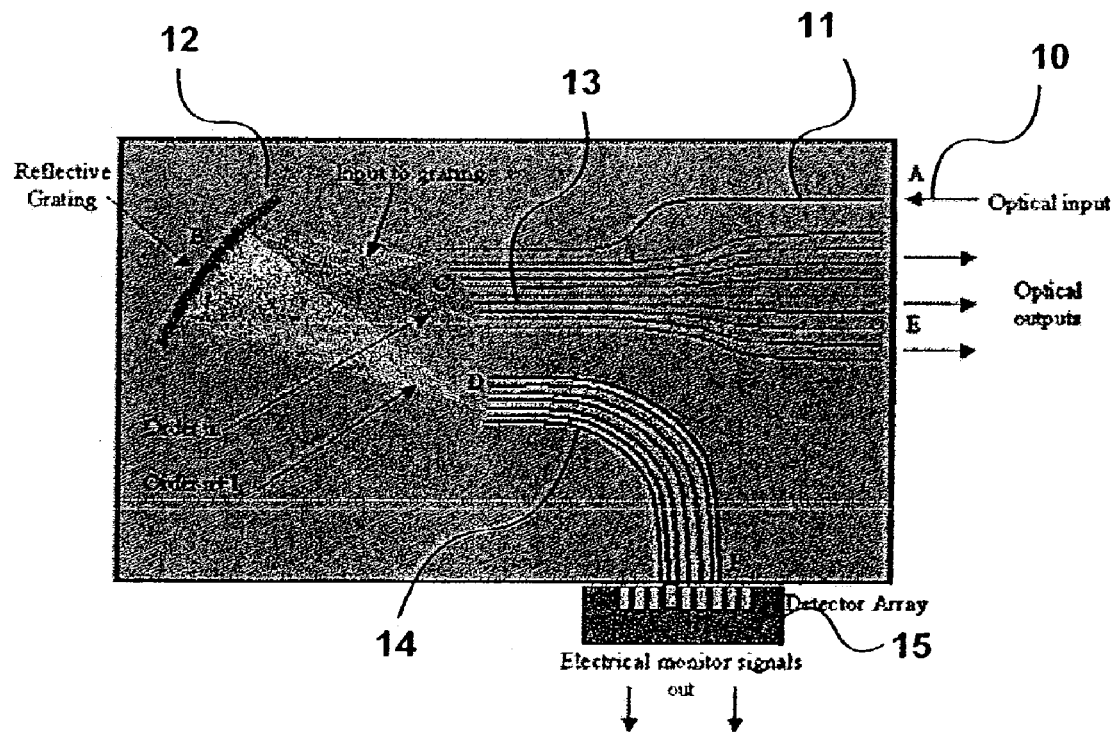
Figure 3:
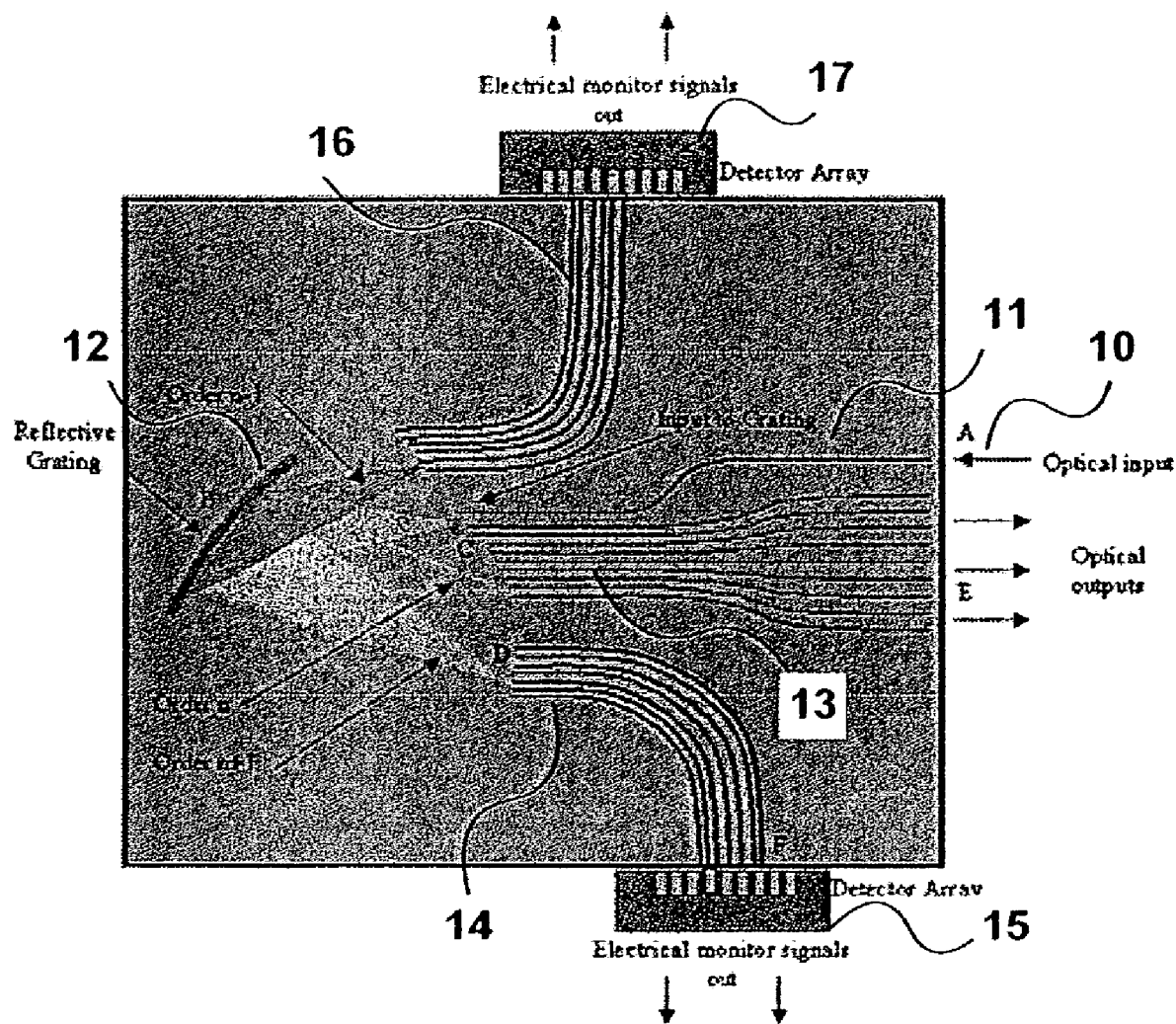

The invention will now be described in more detail, by way of examples, with reference to the accompanying drawings, in which:

FIG. 1 is a schematic drawing showing the functionality required for integrating optical demultiplexing with optical channel monitoring;

FIG. 2 is a practical layout of an Echelle Grating demultiplexer designed with monitor outputs positioned at the foci of the higher-order diffraction; and FIG. 3 is a practical layout of an Arrayed Waveguide Grating (AWG) demultiplexer designed with monitor outputs positioned at both the order n+1 and order n−1 foci (The n+1 and n−1 outputs can be off-grid in order to monitor extra information beyond just power, such as wavelength and OSNR).

DETAILED DESCRIPTION OF THE PREFERRED EMBODIMENTS

EXAMPLE NO. 1

In the embodiment of the invention shown in FIG. 2, the components are integrated into a single device. An optical signal 10 consisting of many different wavelength channels is input to the input waveguide at A. Optical signal 10 travels through the input waveguide 11, and then spreads out laterally to fill the echelle diffraction grating 12 at B. The diffraction grating 12 reflects and diffracts the light back to a first set of several different output waveguides 13, located at C, based on wavelength. This is termed the order n of the diffracted light.

At the same time, a small fraction of the main signal is reflected and diffracted into a higher order, termed "order n+1", which is focused onto a second set of monitor output waveguides 14 at position D. Positions C and D are located at the foci of the diffraction grating for their respective orders.

The main optical signal is routed off the chip from C to positions E, where it is coupled to an array of optical fibers.

The monitoring signal is routed off the chip from D to position F, where it is coupled to an array 15 of optical detectors.

This configuration has several advantages. The single device shown in FIG. 2 accomplishes the functionality illustrated in FIG. 1, but is a single component, versus the three components illustrated in FIG. 1. This leads to enormous reductions in assembled device cost. The main optical signal is demultiplexed with no significant additional loss or PDL from an optical tap. This results in improved performance at the system-level as well. The monitoring signal is created from the higher-order diffraction, with no additional PDL from an optical tap, and no fiber coupling between separate components. The single device shown in FIG. 2 replaces the three components illustrated in FIG. 1, and combines them onto a small optical chip. This also reduces the footprint and improves the reliability of the completed module. The optical chip illustrated in FIG. 2 can be temperature controlled using a single heater/cooler. The use of separate demultiplexers, as illustrated in FIG. 1, implies roughly twice the power consumption of the new invention. The invention leads to a significant reduction in power requirements.

EXAMPLE NO. 2

In the embodiment shown in FIG. 3 an optical signal 10 consisting of many different wavelength channels is input to the input waveguide 11 at A. The device operation is identical to that described in Example No. 1, with the main optical signal being demultiplexed and output through order n. However, in this example there are also monitor output waveguides 16 positioned to collect light of order n+1, as well as n−1. The monitor output waveguides 14 for order n+1 can be identical to those described in Example No. 1, positioned on-grid at channel center, and provide information on the power in each channel. The monitor outputs for order n−1, however, can be positioned off-grid, e.g. between channels, and provide information on the inter-channel noise.

The outputs can also be designed so that the ratio between complementary detectors is a known function of wavelength, which allows the device to monitor the wavelength of each channel. This can be accomplished, for example, by using the technique described in U.S. Pat. No. 6,339,662, entitled "Wavelength stabilized planar waveguide optical devices incorporating a dispersive element", the contents of which are herein incorporated by reference, or by other similar techniques.

The advantages of this configuration include all the advantages listed for Example No. 1. In addition, wavelength/OSNR measurements are made possible with no moving parts.

Typically, wavelength and OSNR monitoring techniques often involve devices with moving parts such as tunable filters, which often exhibit reliability issues and have very slow scan times. The invention described here allows the monitoring of a signal at several positions on or off grid, all measured simultaneously. This results in a device with no moving parts, with a very fast scan time.

The integrated photonics devices can be made using silica technology in a manner known per se.

It will be appreciated by one skilled in the art that many other variants of the invention are possible within the scope of the appended claims.

We claim:

1. A device for integrating demultiplexing and optical channel monitoring, comprising:

a diffraction grating;

an input waveguide providing an optical input to said diffraction grating; a first set of output waveguides providing optical outputs to said diffraction grating at a predetermined order of diffraction;

a second set of output waveguides providing monitor outputs to said diffraction grating at another order of diffraction different from said predetermined order of diffraction; and a third set of output waveguides at a further order of diffraction different from said predetermined order of diffraction and said another order of diffraction, said third set of outputs providing monitor outputs to said diffraction grating;

wherein said second set of output waveguides are positioned at channel locations, and said third set of output waveguides are positioned at between-channel locations to provide information on inter-channel noise.

2. A device as claimed in claim 1, wherein said another order of diffraction is higher than said predetermined order of diffraction.

3. A device as claimed in claim 1 wherein said farther order of diffraction is lower than said predetermined order of diffraction.

4. A device as claimed in claim 3, wherein said predetermined order of diffraction is order n, said another order of diffraction is order n+1, and said farther order of diffraction is order n−1.

5. A device as claimed in claim 1, farther comprising a detector array coupled to said second set of waveguides.

6. A device as claimed in claim 5, wherein said diffraction grating is an echelle grating.

7. A device as claimed in claim 6, which is in the form of an integrated optical device.

8. A method of performing demultiplexing and optical channel monitoring, comprising the steps of:
  directing an optical input signal containing multiple channels to a diffraction grating;
  receiving reflected and diffracted signals at a first set of output waveguides providing optical outputs at a predetermined order of diffraction; and
  receiving reflected and diffracted signals at a second set of output waveguides providing monitor outputs at another order of diffraction different from said predetermined order of diffraction;
  wherein reflected and diffracted signals are received at a third set of output waveguides at a further order of diffraction different from said predetermined order of diffraction and said another order of diffraction, said third set of output waveguides providing monitor outputs to said diffraction grating; and
  wherein said second set of output waveguides are positioned at channel locations, and said third set of output waveguides are positioned at between-channel locations to provide information on inter-channel noise.

9. A method as claimed in claim 8, wherein said another order of diffraction is higher than said predetermined order of diffraction.

10. A method as claimed in claim 8, wherein said further order of diffraction is lower than said predetermined order of diffraction.

11. A method as claimed in claim 10, wherein said predetermined order of diffraction is order n, said another order of diffraction is order n+1, and said further order of diffraction is order n−1.

* * * * *